Nov. 26, 1968   R. S. GOY ETAL   3,413,179
FLEXIBLE SHEET MATERIAL AND METHOD FOR MAKING SAME
Filed Dec. 28, 1966   2 Sheets-Sheet 1

Ronald Stansfield Goy
Robert Anthony William Longden
Michael David Roll
Roland William Pearson
    Inventors By Rauber & Lazar
    Their Attorneys

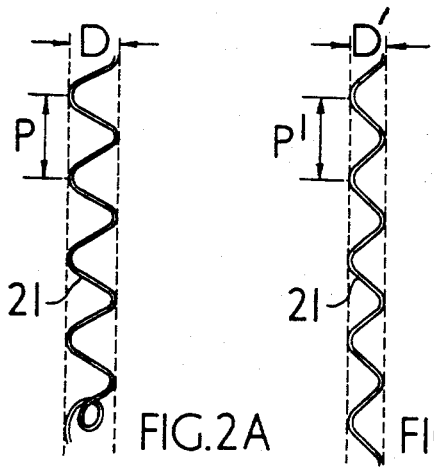
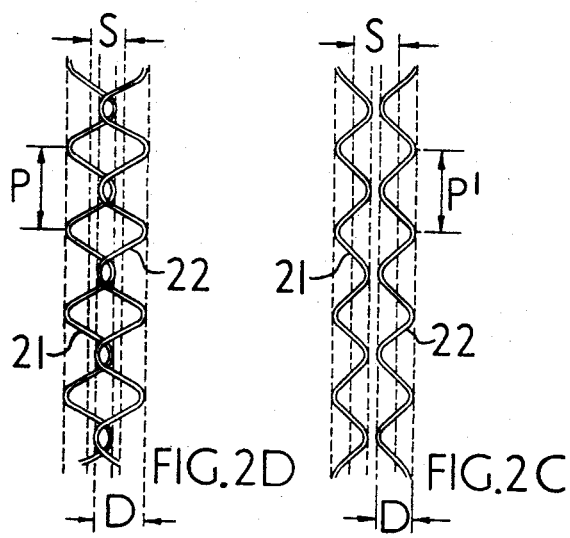

3,413,179
FLEXIBLE SHEET MATERIAL AND METHOD
FOR MAKING SAME
Ronald Stansfield Goy, Sutton Coldfield, Robert Anthony William Longden, Birmingham, Michael D. Roll, Castle Bromwich, near Birmingham, and Roland William Pearson, Disley, England, assignors to Dunlop Rubber Company Limited, London, England, a British company
Continuation-in-part of application Ser. No. 176,051, Feb. 27, 1962. This application Dec. 28, 1966, Ser. No. 605,271
17 Claims. (Cl. 161—60)

ABSTRACT OF THE DISCLOSURE

A leather-like sheet material made from crimped continuous filaments such as silk, nylon, polyethylene and other such natural or synthetic fibres under tension brought closely together so that the spacing between filaments is no greater than the amplitude of the crimped structure, and thereafter releasing the tension whereby the turns of the crimped filaments intermingle into a mat. Bonding material such as a thermoplastic resinous or elastomeric binder is introduced into the mat or on the filaments prior to the formation of the mat. The mat is thereafter consolidated by compression. Heat may also be applied during the process or after consolidation.

Figure 1:
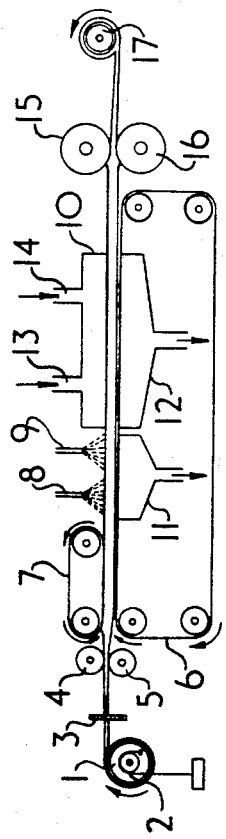

The present invention relates to leather-like sheet material and further to a method of making such material and is a continuation-in-part of our co-pending application Ser. No. 176,051 filed Feb. 27, 1962, now abandoned.

In the past there have been proposals for the manufacture of materials which could be used as a substitute for natural leather. However, these artificial leathers, which have mainly consisted of woven or knitted fabrics coated with an elastomeric or resinous composition, or of one or more plies of non-woven fabric the individual layers of which were bonded with an elastomeric or resinous binder, have not been completely suitable as a replacement for natural leather. The previously prepared artificial leathers have not had the ability to stretch over toe caps (lasting) without creasing and have not had high resistance to flexing. We have discovered a method for the manufacture of a material which has the appearance of natural leather and which is largely free from the disadvantages associated with previously known artificial leathers.

The present invention provides a leather-like sheet material comprising a consolidated mat of interpenetrated crimped continuous fibres bonded together with a resinous or elastomeric bonding agent.

The present invention further provides a method for the production of a leather-like sheet material comprising forming a mat of crimped continuous fibres and consolidating the mat in the presence of material affording a bonding agent, wherein in the formation of the mat the crimped continuous fibres have been subjected to tension and allowed to relax before the mat is consolidated.

The crimped filaments may have parts of undulating, helical and other shapes. Each undulation, turn or coil has a diameter or amplitude and a pitch dimension from corresponding points on an adjacent undulation, turn or coil. When the crimped filaments are stretched lengthwise, the pitch of the crimped filament increases and the amplitude decreases. When the stretched filaments are placed in an assembly in which they are spaced more closely than their amplitude in the unstretched condition and the tension released the pitch of the crimpings decreases and the amplitude increases to its unstretched position and, as a result, the coils or turns and undulations of each crimped filament interpenetrate and entangle those of adjacent filaments to form a mat. A mat of one or more layers may be formed.

It is to be understood that the crimping of the fibres and the formation of a mat may take place in one continuous operation. Thus, the fibres may be placed under tension and treated so that they have a potential crimp and then relaxed in an assembly in which they are spaced more closely than the amplitudes of the crimps.

The mat may be formed by various methods, e.g. by plying together at least two separate layers of crimped continuous fibres which have been collected under tension, or by collecting under tension preferably substantially parallel crimped or potentially crimped continuous fibres to the desired depth which upon relaxation provide a mat of crimped fibres, or by drawing off a creel or beam an assembly of tensioned crimped continuous fibres of the desired depth, which are then relaxed to provide a mat. In this latter method the fibres may be drawn off two or more beams with the crimped continuous fibres from one beam being combined with the crimped continuous fibres of another beam to give the desired depth of crimped continuous fibres. When the mat is formed from separate layers of crimped continuous fibres, the general direction of the fibres in each layer may be generally parallel with or at an angle to the general direction of the fibres in an adjacent layer or layers.

Suitably when the fibres are in a relaxed state the mats may be from 10 mm. to 50 mm. thick and after consolidation may be from 0.5 mm. to 2.5 mm. thick. The width and length of the consolidated mat may be chosen to suit the final use of the material.

In the method according to the invention the relaxation of the fibres, application of material affording the bonding agent and formation of the mat are carried out before consolidation, the procedures given in (a) to (g) below being some specific methods by which the present invention may be carried out.

(a) The crimped or potentially crimped continuous fibres are collected under tension into layers, the layers are plied together, and then tension is allowed to relax to form a mat. As the fibres recover or gain their crimp upon relaxation, interpenetration of the fibres of adjacent layers occurs. Material affording the bonding agent is applied to the resultant sheet, which is then consolidated.

(b) The crimped continuous fibres are collected under tension into layers, to which material affording the bonding agent is applied. The tension in the fibres is next removed, and the layers are plied together to form a mat and then consolidated. The layers with the bonding material applied thereto may be heated before they are plied together.

(c) The crimped or potentially crimped continuous fibres are collected under tension into layers, the tension on the fibres is relaxed and the separate layers are treated with material affording the bonding agent. The layers are then plied together, heated and consolidated.

(d) The crimped or potentially crimped continuous fibres are collected under tension into layers, and the tension on the layers is relaxed. The layers are plied together, material affording the bonding agent in sheet or mesh form is interposed between layers of the fibres, and the material is consolidated by heat and pressure. The number of layers of bonding material employed will at least partially depend upon the number of layers of fibres which are plied together.

(e) The crimped or potentially crimped continuous fibres are collected under tension into layers and in one or more of the layers the bonding material is incorporated in thread form to give a layer of a mixture of fibre and bonding material. The layers are released from tension, plied together and consolidated. If necessary, additional bonding material may then be applied, and this may be either the same as the material employed previously in thread form (i.e. before consolidation) or some other bonding material.

(f) The crimped or potentially crimped continuous fibres are collected under tension, preferably in substantially parallel form, until a layer of the desired thickness is obtained. The tension on the fibres is allowed to relax to provide a mat, material affording the bonding agent is applied to the mat, and the mat is then consolidated. This specific method may be carried out as a continuous process, e.g. as described below with reference to the accompanying drawings.

(g) The crimped or potentially crimped continuous fibres, preferably in substantially parallel form, are continuously collected under tension until a layer of the desired thickness is obtained. Material affording the bonding agent is applied to the tensioned fibres, the tension is removed, additional bonding material is applied if desired, and the resultant impregnated mat is then consolidated.

In any of the methods (a) to (g) inclusive, the mat may be heated before or after consolidation.

In the methods described above under (a) to (e) inclusive, the mats may conveniently be formed by winding the fibres under tension on to a rectangular frame, the loop of fibres on the frame which constitutes the layer being removed from the frame and if necessary supported on a frame of smaller dimensions than the frame upon which the fibres were wound under tension. The looped layers of fibres are plied-up merely by placing one layer of fibres on another layer. An alternative method of plying-up the fibres may be employed in which the layer of fibres which has been wound under tension is supported upon a frame of smaller dimension than the frame upon which it was wound and is slipped inside a looped layer of fibres while they are still under tension or while the tensioned fibres are being removed from the frame upon which they were wound.

In methods (f) to (g) above, the layer of fibres is conveniently formed by winding the fibres under tension on to a rectangular frame until a looped layer of desired thickness is obtained. When the layer is removed from the frame it may be supported if necessary by a frame of smaller dimensions than the frame upon which the fibres were wound under tension.

The present invention may also be carried out in a continuous or semi-continuous manner. An assembly of fibres in yarn form may be drawn under tension from a creel or beam and allowed to relax under controlled conditions by suitable means such as by passing between two pairs of rollers, the second pair rotating at a slower speed than the first pair. The relaxed fibres may be further consolidated and intermixed by passage through a needle loom. The positions of the individual yarns in the tensioned assembly may be if necessary controlled by known means such as a comb, and the form taken by the assembly on relaxation may if required be controlled by a partial constriction between moving belts or suitably shaped plates or tubular construction. If required, the positions of the yarns can be varied by yarn guides which traverse adjacent yarns or groups of yarns over one another. Subsequent operations, such as the application of bonding material (preferably in solution, dispersion, or vapor form), drying or solvent removal, and consolidation, may be carried out continuously; it is possible to cut the mats of fibres into separate lengths which are subsequently treated individually, but this method is not preferred. In one arrangement, the beam of pre-tensioned fibre has its rotation retarded by a brake or other means as the fibre is drawn off by draw-off rollers, the tension in the fibres being maintained or altered by adjusting the degree of braking. If the impregnated mat is heated before consolidation, the rollers which consolidate the mat impregnated with material affording the bonding agent may be cooled to reduce the temperature of the mat during consolidation. The bonding material in the continuous or semi-continuous method may also be applied in the form of a sheet or a powder which can be softened to cause adhesion to the crimped continuous fibres by application of heat either before the mat of fibres is consolidated or during consolidation. The consolidated mat may then conveniently be wound into a roll for storage until required. As mentioned earlier, bonding material in dispersion or vapor form may be used; a specific example of dispersion-form bonding material is a compounded butadiene-acrylonitrile copolymer latex, and a specific example of vapor form bonding material is acrylic acid monomer vapor, with which bonding is effected by inducing polymerization, e.g. by means of a catalyst previously deposited on the fibres, by means of ultra-violet light, or by irradiation.

The fibres employed in the method of the present invention are crimped continuous filament fibres, conveniently in the form of multi-filament yarns, and they may be any which can be crimped and which have sufficient strength, elongation and resilience not to lose their crimp on relaxation after stretching under just sufficient tension to remove the crimp. The fibres may take the form of a stretch-yarn treated by a torque twisting process, a twistless yarn crimped by heating and then passing over a continuously-cooled knife edge (the process known as "edge crimping"), or chemically-crimped yarn. For example, if edge-crimped yarn is used in a continuous method in accordance with the present invention, it may if desired be carried out continuously as one stage in the continuous method itself, which may then comprise (e.g.) forming a continuous web by assembling a warp of twistless thermoplastic fibres of the required width, heating the warp and passing over a cooled knife edge under tension, allowing the warp to relax (when the filaments intermingle with each other at random in three dimensions), and so forth. Suitable fibres include man-made fibres such as nylon-type fibres, polyethylene terephthalate-type fibres, polyacrylonitrile-type fibres, polyolefine fibres, and rayon-type fibres, although natural continuous filament fibres such as silk may be employed. Fibres for which the filament denier is between 0.5 and 20 may be used.

It is not essential that only a single type of fibre should be used. Thus, alternate yarns of two different types of crimped or potentially crimped fibres may be used to make up a warp, and furhter mixing may be effected by traversing. Similarly two or more twistless yarns of different chemical constitution, which may however be of equal retraction properties, may be crimped together before winding on a beam or assembling on a reel.

The bonding material will normally comprise a thermoplastic resinous or elastomeric binder which should preferably be flexible at room temperature. However, the bonding material may be of a composite nature instead of being represented by a single bonding composition; more particularly, there may be a first bonding composition which bonds the fibres simply at their crossing points and which may accordingly be of relatively low flexibility, and also a second bonding composition which extends more generally around the fibres and the first bonding composition and which should have good flexibility. Suitable elastomeric binders include polyurethane rubber (or precursors thereof), natural rubber, butyl rubber, rubbery styrene-butadiene copolymers, butadiene-acrylonitrile copolymers, polychloroprene rubber and other synthetic rubbery polymers. Suitable resinous binders include polyolefines such as polyethylene. As indicated earlier, the bonding material may be applied in the form of a solution, e.g. a solution of a polyurethane rubber in methylethyl ketone, the solvent being allowed to evaporate before the layers of fibres are consolidated. Where two or more bonding compositions are applied in succession, at least one of them should be of an elastomeric nature (at room temperature). The binder(s) may contain curing agents and plasticizers that are conventionally employed in elastomeric and resinous compositions.

When bonding material in solution form is used, it is in many cases useful to apply to the solution-saturated mat a liquid which is miscible with the solvent but which is a non-solvent for the bonding material dissolved in the solvent. This causes the bonding material to be precipitated on and among the fibres, and in this manner it can often be distributed much more uniformly than by using the solution alone (since in the latter case the dissolved material tends to be carried towards the surfaces of the mat when the solvent is removed). A specific example of the application of this technique is the use of a solution of a thermoplastic polyurethane rubber in methylethyl ketone in conjunction with n-hexane as the binder-precipitating liquid.

The consolidation of the mats of fibres is conveniently carried out by pressing and heating the mats between press platens or rollers, or alternatively heating the impregnated mat and then passing the mat between cooled rollers. The platens or rollers may be provided with an engraved surface, so that an embossed pattern is impressed on the surface of the final leather-like material, or the leather-like material may if desired be embossed at a later stage. Excessive consolidation of the product can be remedied by subsequent heating, provided that cross-linking has not taken place in the bonding material by this stage.

Additional surface coatings can if desired be applied to the leather-like material either before or after consolidation or embossing in order to improve the finished appearance of the material.

The coating technique described in the co-pending application of Watson and Spittle, Ser. No. 251,729, filed Jan. 16, 1963, now U.S. Letters Patent 3,330,713 issued July 11, 1967, may if desired be utilised in the case of the present invention for the application of an additional surface coating and/or at an earlier stage for the application of bonding material.

The temperature employed in the consolidation should be sufficiently high to soften the bonding material but not so high as to decompose the bonding material or the fibre. Thus, the temperature chosen will at least partially depend upon the materials being consolidated.

The weight ratio of fibre to bonding material in the final leather-like product may vary over a wide range, and may for example range from 9.0:1 to below 0.8:1, ratios of from 8:1 to 1:1 normally being employed.

The following examples illustrate the method of the present invention:

EXAMPLE 1

A plied bulked crimped nylon yarn (two-fold 70 denier) was wound under tension on to a rectangular frame to produce a warp or web 36 inches long and approximately 9 inches wide with all the yarns lying parallel. After removal from the frame and consequent release of the tension, the web contracted in length and increased in width until it became approximately a 12-inch square. Its weight was roughly 12 g.

The contracted web was sprayed with a 10 percent solution of Estane 5740X2 in methylethyl ketone (Estane 5740X2 is a high molecular weight thermoplastic polyurethane rubber) and sandwiched between two similar webs arranged so that their fibres run at right-angles to those of the central web. The upper and lower surfaces of the sandwich were sprayed with Estane solution.

The solvent was allowed to evaporate and the sheet was pressed at 140° C. between the platens of a hydraulic press to give a thin parchment-like sheet. This sheet was then allowed to expand in thickness by heating at 140° C. under atmospheric pressure to give a final product 0.035 inch thick.

The ratio of fibre to Estane by weight in the finished product was 70:30. When tested, the sample had the following physical properties:

|  | (a) | (b) |
| --- | --- | --- |
| Tensile strength (p.s.i.) | 2,800 | 850 |
| Tongue tear (lb./in. thickness) | 1,140 | 950 |
| Stitch tear (lb./in. thickness) | 970 | 720 |
| Plasticity (percent retention) | 20 | 15 |
| Water vapor transmission (mg./in.²/hour) | 10 | 10 |
| Flexing (Hall machine) no failure after 10³ flexes | | |

(a) Sample cut parallel with yarn of outer plies.
(b) Sample cut transversely to outer plies.

EXAMPLE 2

A plied bulked crimped nylon yarn (two-fold 100 denier) was wound under tension on to a rectangular frame to produce a web 36 inches long and approximately 9 inches wide with all the yarns lying parallel.

While under tension on the frame it was sprayed with a 10 percent solution of Estane in methylethyl ketone. After the solvent had evaporated the fibres were found to be held in the extended position by the Estane coating. The web was removed from the frame and put into an oven maintained at 120° C. After roughly one minute under these conditions the web had contracted in length and increased in width to approximately a 12-inch square.

This was removed from the oven and laid on another similarly made web, so that the fibres of the two webs ran at right-angles to each other.

This composite web was lightly pressed at 140° C. between the platens of a hydraulic press to give a final product, approximately 0.035 inch thick.

The ratio of fibre to Estane in the finished product was 60:40, when tested the sample had the following physical properties:

|  | (a) | (b) |
| --- | --- | --- |
| Tensile strength (p.s.i.) | 1,500 | 1,450 |
| Tongue tear (lb./in. thickness) | 880 | 700 |
| Stitch tear (lb./in. thickness) | 590 | 590 |
| Plasticity (percent retention) | 8 | 4 |
| Water vapor transmission (mg./in.²/hour) | 20 | 20 |
| Flexing (Hall machine) no failure after 10⁶ flexings | | |

(a) Samples cut parallel with yarn of one ply.
(b) Samples cut at right-angles to sample (a).

EXAMPLE 3

A plied bulked crimped nylon yarn (two-fold 100 denier) was wound under tension on to a rectangular frame to produce a web 36 inches long and approximately 9 inches wide with all the threads lying parallel. After removal from the frame and consequent release of the tension, it contracted in length and increased in width until it became approximately a 12-inch square. Four such webs were made.

Estane was dissolved in methylethyl ketone and poured into a shallow trough so that after the solvent had evaporated, a thin film of Estane VC approximately 12 inches square was left behind. This was dusted with French chalk and removed from the trough. Two such films were made.

A multi-layer sandwich of the nylon webs and Estane films was made as follows.

One nylon web, one sheet of Estane, three nylon webs, one sheet of Estane. The nylon webs were oriented so that the threads in a given web were at right-angles to the threads in adjacent webs.

This sandwich was lightly pressed at 140° C. between the platens of a hydraulic press to give a final product 0.060 inch thick.

The ratio of fibre to Estane in the finished product was

70:30, and when tested, the sample had the following physical properties:

|  | (a) | (b) |
|---|---|---|
| Tensile strength (p.s.i.) | 3,400 | 3,300 |
| Tongue tear (lb./in. thickness) | 860 | 780 |
| Stitch tear (lb./in. thickness) | 1,340 | 1,070 |
| Plasticity (percent retention) | 12 | 4 |
| Flexing (Hall machine) no failure after $10^6$ flexings | | |

(a) Sample cut parallel with yarn of outer plies.
(b) Sample cut transversely to outer plies.

EXAMPLE 4

A plied bulked crimped nylon yarn (two-fold 100 denier) was wound under tension onto a rectangular frame to produce a web 36 inches long and approximately 9 inches wide with all the threads lying parallel. After removal from the frame and consequent release of the tension it contracted in length and increased in width until it became approximately a 12-inch square.

A similar procedure was carried out with two threads wound together, one of plied bulked crimped nylon yarn and one of polyethylene thread, to give a mixed web. Two such webs were made, and the plain nylon web sandwiched between them so that the threads in adjacent webs were laid at right-angles to each other.

The sandwich was pressed at 120° C. between the platens of a hydraulic press to give a thin sheet. This was removed from the press, dusted lightly with high-density polyethylene powder and pressed again at 120° C. The sheet so obtained was allowed to expand in thickness by heating to 140° C. under atmospheric pressure, to give a sheet approximately 0.035 inch thick.

The ratio of nylon to polyethylene in this finished product was approximately 80:20, and when tested, the sample had the following physical properties:

|  | (a) | (b) |
|---|---|---|
| Tensile strength (p.s.i.) | 3,500 | 2,350 |
| Tongue tear (lb./in. thickness) | 1,380 | 1,320 |
| Stitch tear (lb./in. thickness) | 1,700 | 1,800 |
| Plasticity (percent retention) | 30 | 20 |
| Flexing (Hall machine) no failure after $10^6$ flexings | | |

(a) Sample cut parallel with yarn of outer plies.
(b) Sample cut transversely to outer plies.

EXAMPLE 5

A plied bulked crimped nylon yarn (two-fold 100 denier) was wound under tension onto a rectangular frame to produce a web 36 inches long and approximately 9 inches wide with all the threads lying parallel. After removal from the frame and consequent release of the tension, it contracted in length and increased in width until it became approximately a 12-inch square. A second web was wound in the same way, and as it was removed from the frame, the first web, now 12 inches square, was slipped inside it, so that the threads of the two webs lay at 90° to each other. The composite web contracted down to approximately a 12-inch square. Two such composite webs were made.

A sheet of an Adiprene C containing composition of formulation set out below 12 inch square and of weight 66 g. was laid between the two composite webs.

The resulting sandwich was heated to 130° C. for 10 minutes and then pressed at 150° C. between the platens of a hydraulic press for approximately one hour. The resulting sheet was 0.060 inch thick and had a fibre to Adiprene C ratio of 50:50.

The sample had the following physical properties:

Tensile strength (p.s.i.) _____ 3190
Tongue tear (lb./in. thickness) _____ 913
Stitch tear (lb./in. thickness) _____ 1406
Plasticity (percent retention) _____ 40
Flexing resistance more than $10^6$ cycles.

Adiprene C composition:
Adiprene C (a vulcanizable polyurethane rubber) _____ 100
Sulphur _____ 0.75
Dibenzthiazyl disulphide _____ 3.0
Mercaptobenzthiazole _____ 1.0
Zinc chloride/dipenzthiazyl disulphide complex _____ 0.35

EXAMPLE 6

The procedure of Example 5 was repeated, but the fibre/binder ratio in the product was altered to 65:35. The product gave the following test results:

Tensile strength (p.s.i.) _____ 3960
Tongue tear (lb./in. thickness) _____ 703
Stitch tear (lb./in. thickness) _____ 1442
Plasticity (percent retention) _____ 20
Flexing resistance more than $10^6$ cycles.

EXAMPLE 7

A band of crimped continuous-filament yarn of two-fold 70 denier nylon was wound uniformly onto a frame under tension, so that there were approximately 3000 parallel yarns in a 9 inch width of frame. The band of yarns, still under tension, was placed between two smooth metal plates, the inner surfaces of which were approximately ½ inch apart and the tension in the yarns allowed to relax. The plates were then removed. The relaxed filaments had formed a mat approximately 12 inches square by 1 inch thickness.

The mat was placed in a 10 percent solution of Estane 5740X2 in a flat dish and gently padded to distribute the solution evenly in the mat, and the solvent was allowed to evaporate.

The impregnated mat was then heated to 140° C. and lightly consolidated between the platens of a press, to yield a leather-like sheet approximately 12 inches square by 0.050 inch thick.

The ratio of fibre to binder by weight was 62:38.

Physical tests carried out on this sample gave the following results:

| Direction referred to tensioned yarns | Parallel | Transverse |
|---|---|---|
| Tensile strength (p.s.i.) | 3,170 | 4,520 |
| Elongation at break (percent) | 63 | 63 |
| Modulus at 40 percent extension | 2,018 | 2,523 |
| Tongue tear (lb./in. thickness) | 610 | 680 |
| Stitch tear (lb./in. thickness) | 1,670 | 1,790 |
| Plasticity (percent retention) | 10 | 12 |
| Water vapor transmission (mg./in.²/hour) | 30 | 30 |
| Flexing more than $10^6$ | | |

In the above examples the products obtained all had a three-dimensional random arrangement of fibres in the consolidated product, were pliable and had a leather-like appearance and were suitable for use as a substitute for natural leather.

EXAMPLE 8

A twistless crimped nylon (840 denier; 6 denier per filament) was bulked by the false twist process and wound under tension on a rectangular frame to produce a web 48 inches long and approximately 10 inches wide with all the threads lying parallel. The web was clamped at each end while in a horizontal position, at points adjacent to the winding arms. The winding frame was removed. The web was cut along the folds at each end to yield separate webs of 30 grams weight. The separated webs were relaxed by the simultaneous application of heat from an infra-red heater above the fibres, and from a contact heater below. The webs contracted to 12 inches in length, with simultaneous intermingling of the fibres.

A commercially-available latex, known as "Hycar 1571," consisting of an emulsion in water of a butadieneacrylonitrile-methacrylic acid copolymer (with 40 percent total solids), was compounded as follows:

| | Part(s) by wt. |
|---|---|
| Latex | 500 |
| Zinc oxide (50 percent in water) | 36 |
| A ball-milled dispersion consisting of— | |
| Water | 100 |
| Burnt umber | 8 |
| Yellow ochre | 12 |
| Bentonite clay | 0.4 |
| Dispersing agent | 0.4 |

An aluminium tray, of internal dimensions 1 inch by 12¼ inches by 12¼ inches was placed on a 1 foot square hot plate. A mixture of 150 grams of the compounded latex, 100 grams of water and 15 grams of a 25 percent dispersion of sodium silicofluoride was poured into the tray. One of the relaxed webs was placed in the tray and the latex forced through it by application of pressure from a perforated gauze sheet. The latex was gelled in the presence of the fibres by application of heat from the hot plate. Gelation occurred at a temperature of approximately 70° C.

The impregnated web was washed, and mangled to reduce the water content to approximately 100 grams. The web was dried in an air-oven at 50° C., and then compressed in a spaced mould at 120° C. to 1.2 mm. thickness.

The compressed sheet had the following physical properties:

| Direction referred to tensioned yarns | Parallel | Transverse |
|---|---|---|
| Tensile strength (p.s.i.) | 2,739 | 1,206 |
| Elongation at break (percent) | 89 | 70 |
| Modulus (p.s.i.) at 50 percent extension | 1,887 | 993 |
| Stitch tear (p.s.i.) | 758 | 682 |
| Tongue tear (p.s.i.) | 560 | 624 |
| Plasticity at 25 percent extension (percent) | 23 | 15 |
| Water vapor permeability (mg./cm.²/hour) | 2.5 | 2.5 |
| Average thickness (mm.) | 1.14 | 1.14 |
| Apparent density (g./cc.) | 0.70 | 0.70 |
| Vamp flexing (cycles to fail) | $0.9 \times 10^6$ | $0.97 \times 10^6$ |
| Distention to burst (in.) | 0.52 | 0.52 |
| Load to burst (in.) | 88 | 88 |

For the purposes of comparison, some typical properties of natural leather are tabulated below. It will be seen that the properties of the leather-like material of the present invention compare most favourably with those of natural leather and that in some cases it has better properties than natural leather.

Natural leather.—Typical properties

| | |
|---|---|
| Thickness (mm.) | 0.5–3 |
| Apparent density (g./cc.) | 0.75–0.8 |
| Extension at break (percent) | 50–60 |
| Tensile strength (p.s.i.) | 2500–3500 |
| Stitch tear (lb./in. of thickness) | 900–1000 |
| Tongue tear (lb./in. of thickness) | 150–750 |
| Plasticity (percent) | 8–25 |
| Water vapor permeability (mg./in.²/hour) | 20–100 |
| Flexing, more than 1 million cycles | |

The invention is illustrated in the accompanying drawing in which FIGURE 1 is a schematic vertical section of an apparatus suitable for use in the continuous or semicontinuous production of leather-like sheet material and FIGURES 2A, 2B, 2C and 2D are various views of crimped fibres in the tensioned and relaxed conditions.

In the apparatus shown in FIGURE 1 of the drawing, an assembly of pre-tensioned crimped continuous fibres in yarn form is drawn under tension from a beam 1 whose rotation is retarded by a brake 2, through a comb 3 which controls the positions of the individual yarns, by draw-off rollers 4 and 5. On emerging from the rollers 4 and 5 the assembly is advanced more slowly and is thus allowed to relax between the moving endless belts 6 and 7. As shown in the drawing, the lower belt 6 carries the assembly for a considerable further distance after it has emerged from the relaxation zone between belts 6 and 7, and in fact carries it beneath binder nozzles 8 and 9 and through a drying and heating tunnel 10. Beneath the belt 6, which is of open-mesh or perforated or foraminous construction and is accordingly permeable to the binder solvent or dispersion-medium, are installed two hoppers 11 and 12, located respectively beneath the nozzles 8 and 9 and beneath the tunnel 10, to which suction is applied in order to effect the removal of binder solvent or dispersion-medium from the assembly carried on the belt 6. This operation is assisted by hot dry air admitted to the tunnel 10 at inlets 13 and 14. On leaving the tunnel 10 the material is carried on the belt 6 to a pair of cooled pressure rollers 15 and 16, which effect its consolidation. The consolidated sheet material emerging from rollers 15 and 16 is wound up on the roll 17.

FIGURE 2A illustrates a crimped unstretched filament 21 having a diameter or amplitude D and a pitch P. When the crimped filament is stretched (see FIGURE 2B) the pitch increases to $P^1$ and the amplitude decreases to $D^1$. Two such filaments 21 and 22, can be placed in an assembly (see FIGURE 2C) in the stretched condition with a spacing S between the centre lines of the crimps which is less than their amplitudes in the unstretched condition ($S<D$). On release of the tension (see FIGURE 2D) the amplitude and pitches of the individual filaments change from the relationship shown in FIGURE 2B to that shown in FIGURE 2A. As a result the coils or turns of the filaments 21 and 22 interpenetrate. For simplicity of illustration only two filaments have been shown in the drawings but it will be readily appreciated that if a multiplicity of filaments with a crimp or potential crimp therein are assembled, with a spacing as shown in FIGURE 2C, on release of the tension the filaments will relax to the position shown in FIGURE 2D and will interpenetrate so that a mat will be formed.

Having now described our invention, what we claim is:

1. A method of forming a leather-like sheet material from continuous filaments capable of being retracted into a crimped condition which comprises the following steps: tensioning crimped filaments to reduce the amplitude of the crimp with a force no greater than will permit the filaments to relax into crimped condition, bringing said tensioned filaments into a side-by-side relationship wherein said filaments are substantially independent of entanglement and wherein said filaments are spaced more closely than the amplitude of the respective filaments when in relaxed crimped condition, releasing said tension whereby the crimps or turns of said filaments intermingle to form a mat and introducing into the resulting mat structure a bonding material.

2. A method according to claim 1 in which thereafter the mat is consolidated by compressing the mat to a lesser thickness.

3. The method according to claim 1 in which said crimped continuous filaments are assembled under tension in closely spaced layers.

4. The method according to claim 1 in which thereafter the mat is heated under pressure to compress it to a lesser thickness.

5. The method according to claim 1 in which the step of introducing a bonding material comprises spraying the mat with a solution of an elastomer, evaporating the solvent and thereafter consolidating the mat.

6. The method according to claim 1 comprising heating the mat to release said tension.

7. The method according to claim 1 in which the crimped continuous filaments are assembled under tension into layers, a polymeric bonding material is applied to said layers, the tension is removed, the layers are plied together to form a mat and thereafter the mat is compressed to a lesser thickness to consolidate the mat.

8. A method of forming a leather-like sheet material from continuous filaments of textile material, which comprises assembling uncrimped continuous filaments of synthetic material into a web with said filaments substantially parallel, heating said filaments, passing said web over a cooled knife edge with the filaments in contact with said edge to form tensioned crimped filaments in side-by-side relationship wherein said filaments are substantially independent of entanglement and wherein said filaments are spaced more closely than the amplitude of the respective filaments when in relaxed crimped condition, relaxing the tension of said filaments thereby causing said filaments to mat to a fibrous mat and introducing into the resulting mat structure a bonding material.

9. A method of forming a fibrous mat from continuous crimped filaments of textile material, which comprises winding said filaments under tension on to a frame with the filaments substantially parallel and spaced more closely than the amplitudes of the turns of said filaments to form a web wherein said filaments are substantially independent of entanglement, removing said web from said frame to remove the tension, thereby causing the filaments to contract and intermingle and form a mat, introducing a bonding agent into the mat, compressing the mat and heating the compressed mat to consolidate the mat and to bond the filaments together.

10. A method of forming a leather-like sheet material from crimped continuous filaments, which comprises assembling the filaments under tension in substantially parallel relationship and spaced more closely than the amplitudes of the untensioned filaments wherein said tensioned filaments are substantially independent of entanglement, applying a polymeric bonding material to the filaments, relaxing the tension and thereby causing the crimps or turns of said filaments to contract in length and to interpenetrate one with another to form a mat of the filaments, and consolidating the mat.

11. A method of forming a leather-like sheet material from crimped continuous filaments, which comprises winding a crimped yarn of continuous nylon filaments under tension on to a frame with the filaments substantially parallel and spaced more closely than the amplitude of the crimps or turns of the unstretched filaments wherein said tensioned filaments are substantially independent of entanglement, releasing the tension by removing the filaments from the frame and thereby causing the filaments to contract in length and to intermingle one with another to form a mat, spraying the mat with a solution of a bonding agent, positioning the mat between two similar mats but in which the filaments are disposed substantially at right-angles to the filaments of the enclosed mat, spraying the outer surfaces of the resulting assembly with a solution of a bonding agent and consolidating the mat by compressing it to a lesser thickness.

12. A flexible sheet material having the appearance of natural leather and comprising a consolidated mat of crimped filaments and elastomeric bonding agent wherein the crimped filaments are arranged in one or more layers in which the crimped filaments are substantially parallel, the filaments are spaced more closely than the amplitude of the crimped structure and the crimps or turns of the crimped filaments interengage with the crimps or turns of adjacent crimped filaments.

13. The flexible sheet material of claim 12 having plies of crimped filaments superimposed on each other, the filaments of one ply extending transversely of the filaments of an adjacent ply.

14. The flexible sheet material of claim 12 in which said bonding material comprises a first bonding composition which bonds the filaments at their crossing points and is of low flexibility, and a second composition which extends generally about the filaments of the first bonding composition and which is flexible.

15. The flexible sheet material of claim 14 in which said flexible bonding composition comprises at least one member of the group consisting of polyurethane rubber, natural rubber, butyl rubber, elastomeric styrene-butadiene copolymers, butadiene-acrylonitrile copolymers, polychloroprene rubber, and polyolefines.

16. The flexible sheet material of claim 13 in which the elastomeric bonding material is thermoplastic polyurethane rubber and in which the ratio of filament to the bonding composition is 70:30 and having the following physical characteristics:

|  | (a) | (b) |
| --- | --- | --- |
| Tensile strength (p.s.i.) | 2,800 | 85025 |
| Tongue tear (lb./in. thickness) | 1,140 | 0751 |
| Stitch tear (lb./in. thickness) | 970 |  |
| Plasticity (percent retention) | 20 |  |
| Water vapor transmission (mg./in.²/hour) | 10 | 1009 |
| Flexing (Hall machine) no failure after 10⁶ flexes |  |  |

(a) Sample cut parallel with yarn of outer plies.
(b) Sample cut transversely to outer plies.

17. The flexible sheet material of claim 13 in which the elastomeric bonding material is thermoplastic polyurethane rubber and in which the ratio of filament to the bonding composition is 60:40 and having the following physical characteristics:

|  | (a) | (b) |
| --- | --- | --- |
| Tensile strength (p.s.i.) | 1,500 | 1,450 |
| Tongue tear (lb./in. thickness) | 880 | 700 |
| Stitch tear (lb./in. thickness) | 590 | 590 |
| Plasticity (percent retention) | 8 | 4 |
| Water vapor transmission (mg./in.²/hour) | 20 | 20 |
| Flexing (Hall machine) no failure after 10⁶ flexings |  |  |

(a) Samples cut parallel with yarn of one ply.
(b) Samples cut at right-angles to sampel (a).

References Cited

UNITED STATES PATENTS

| | | | |
|---|---|---|---|
| 2,676,128 | 4/1954 | Piccard | 156—332 XR |
| 2,790,208 | 4/1957 | Smith | 19—66 |
| 2,908,045 | 10/1959 | Stevens | 19—66 |
| 2,908,064 | 10/1959 | Lauterbach et al. | 161—57 |
| 2,994,617 | 8/1961 | Proctor | 117—4 |
| 3,016,581 | 1/1962 | Smith | 19—65 |
| 3,117,055 | 1/1964 | Guandique | 161—170 |

FOREIGN PATENTS 611,444  12/1960  Canada.

EARL M. BERGERT, *Primary Examiner.*

R. A. KILLWORTH, *Assistant Examiner.*